(12) United States Patent
Fujimura et al.

(10) Patent No.: US 10,864,906 B2
(45) Date of Patent: Dec. 15, 2020

(54) METHOD OF SWITCHING VEHICLE DRIVE MODE FROM AUTOMATIC DRIVE MODE TO MANUAL DRIVE MODE DEPENDING ON ACCURACY OF DETECTING OBJECT

(71) Applicant: Panasonic Intellectual Property Corporation of America, Torrance, CA (US)

(72) Inventors: Ryota Fujimura, Kanagawa (JP); Kazuki Kozuka, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/446,525

(22) Filed: Mar. 1, 2017

(65) Prior Publication Data

US 2017/0259814 A1  Sep. 14, 2017

Related U.S. Application Data

(60) Provisional application No. 62/306,173, filed on Mar. 10, 2016.

(30) Foreign Application Priority Data

Nov. 8, 2016  (JP) .................................. 2016-217869

(51) Int. Cl.
*B60W 30/09* (2012.01)
*G08G 1/16* (2006.01)
(Continued)

(52) U.S. Cl.
CPC .......... *B60W 30/09* (2013.01); *B60W 30/182* (2013.01); *B60W 50/14* (2013.01);
(Continued)

(58) Field of Classification Search
CPC ....................................................... B60W 30/09
See application file for complete search history.

(56) References Cited

U.S. PATENT DOCUMENTS 8,352,110 B1  1/2013  Szybalski et al.
9,248,834 B1 *  2/2016  Ferguson ............. G05D 1/0088
(Continued)

FOREIGN PATENT DOCUMENTS

DE  102013012777 A1  2/2015
EP  2549456 A1  1/2013
(Continued)

OTHER PUBLICATIONS

The Extended European Search Report dated Oct. 25, 2017 for the related European Patent Application No. 17159318.9.
(Continued)

*Primary Examiner* — Imran K Mustafa
(74) *Attorney, Agent, or Firm* — Greenblum & Bernstein, P.L.C.

(57) ABSTRACT

An apparatus includes a memory, and circuitry which, in operation, performs operations including, storing, in the memory, an object occurrence map defining an occurrence area where there is a possibility that an object appears, detecting the object included in a captured image of a scene seen in a running direction of a vehicle, switching a vehicle drive mode, based on a result of the detection of the object and the object occurrence map, from an automatic drive mode in which the vehicle is automatically driven to a manual drive mode in which the vehicle is driven manually by a driver, and controlling driving of the vehicle in the switched manual drive mode.

17 Claims, 10 Drawing Sheets

(51) Int. Cl.
*G06K 9/00* (2006.01)
*B60W 50/14* (2020.01)
*B60W 30/182* (2020.01)
*G05D 1/00* (2006.01)
*G05D 1/02* (2020.01)
*B60W 50/00* (2006.01)

(52) U.S. Cl.
CPC ......... *G05D 1/0088* (2013.01); *G05D 1/0238* (2013.01); *G06K 9/00805* (2013.01); *G08G 1/16* (2013.01); *B60W 2050/0072* (2013.01); *B60W 2420/42* (2013.01); *B60W 2420/52* (2013.01); *B60W 2520/06* (2013.01); *B60W 2520/10* (2013.01); *B60W 2552/00* (2020.02); *B60W 2552/20* (2020.02); *B60W 2554/00* (2020.02); *B60W 2555/60* (2020.02); *B60W 2556/00* (2020.02); *G05D 2201/0213* (2013.01)

(56) References Cited

U.S. PATENT DOCUMENTS

| | | | | |
|---|---|---|---|---|
| 2010/0253539 | A1* | 10/2010 | Seder | G08G 1/0962 340/903 |
| 2011/0228980 | A1 | 9/2011 | Ichikawa et al. | |
| 2014/0309833 | A1* | 10/2014 | Ferguson | G06K 9/00798 701/23 |
| 2016/0280234 | A1 | 9/2016 | Reilhac | |
| 2017/0038774 | A1* | 2/2017 | Ebina | B60W 50/14 |
| 2017/0108863 | A1 | 4/2017 | Chundrlik, Jr. et al. | |
| 2017/0123421 | A1* | 5/2017 | Kentley | G01S 17/87 |
| 2017/0158193 | A1* | 6/2017 | Lopez | G08G 1/167 |

FOREIGN PATENT DOCUMENTS

| | | |
|---|---|---|
| EP | 2752833 A1 | 7/2014 |
| EP | 2949548 A1 | 12/2015 |

OTHER PUBLICATIONS

Ziegler Julius et al: "Making Bertha Drive—An Autonomous Journey on a Historic Route", IEEE Intelligent Transportation Systems Magazine, IEEE, USA, vol. 6, No. 2, Jul. 1, 2014 (Jul. 1, 2014), pp. 8-20, XP011546189.

Yong Fang et al: "Multisensor Based Obstacles Detection in Challenging Scenes" In: "Network and Parallel Computing", Nov. 22, 2014 (Nov. 22, 2014), Springer International Publishing, Cham 032548, XP055413156.

The Extended European Search Report dated Jul. 18, 2017 for the related European Patent Application No. 17159318.9.

* cited by examiner

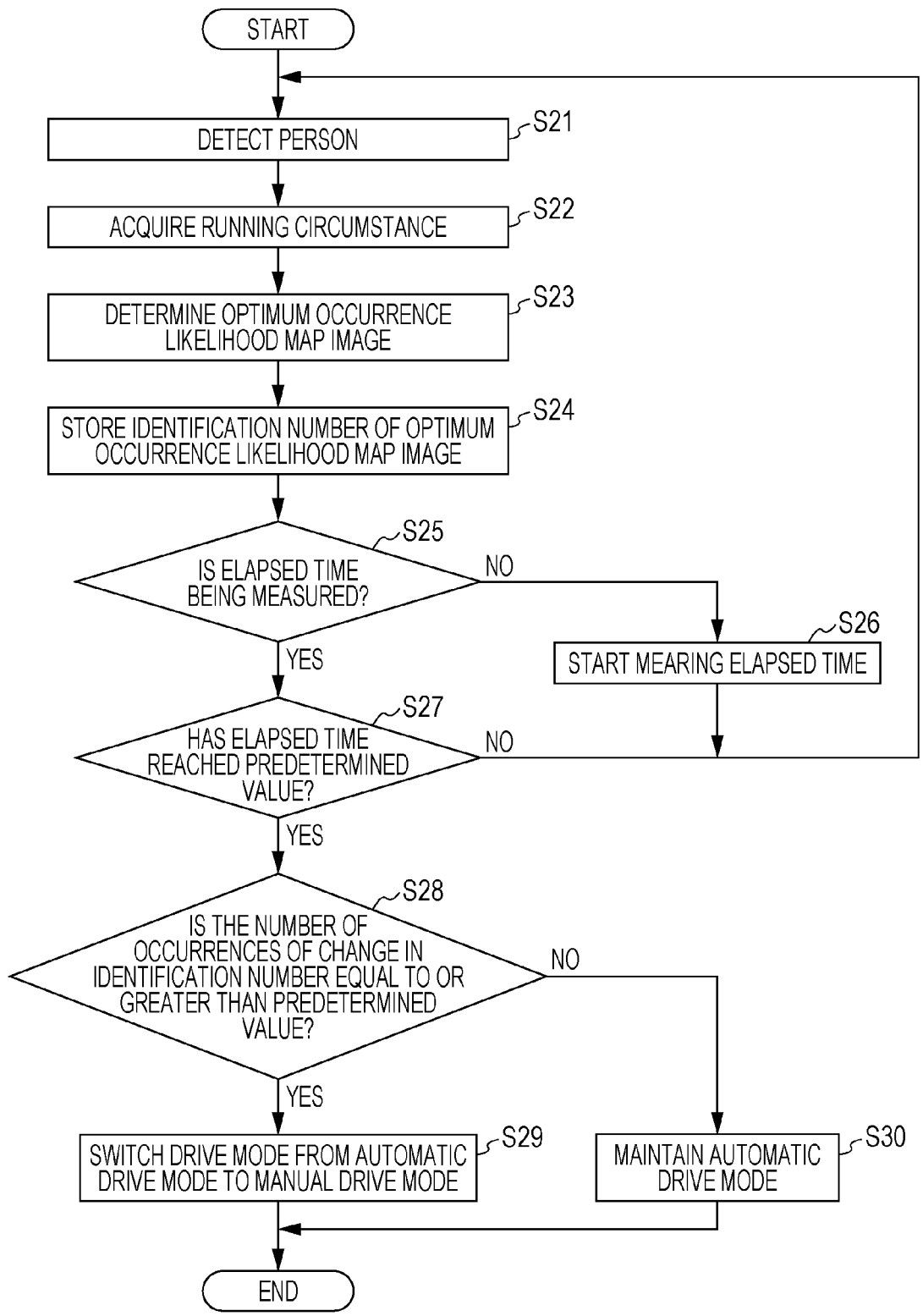

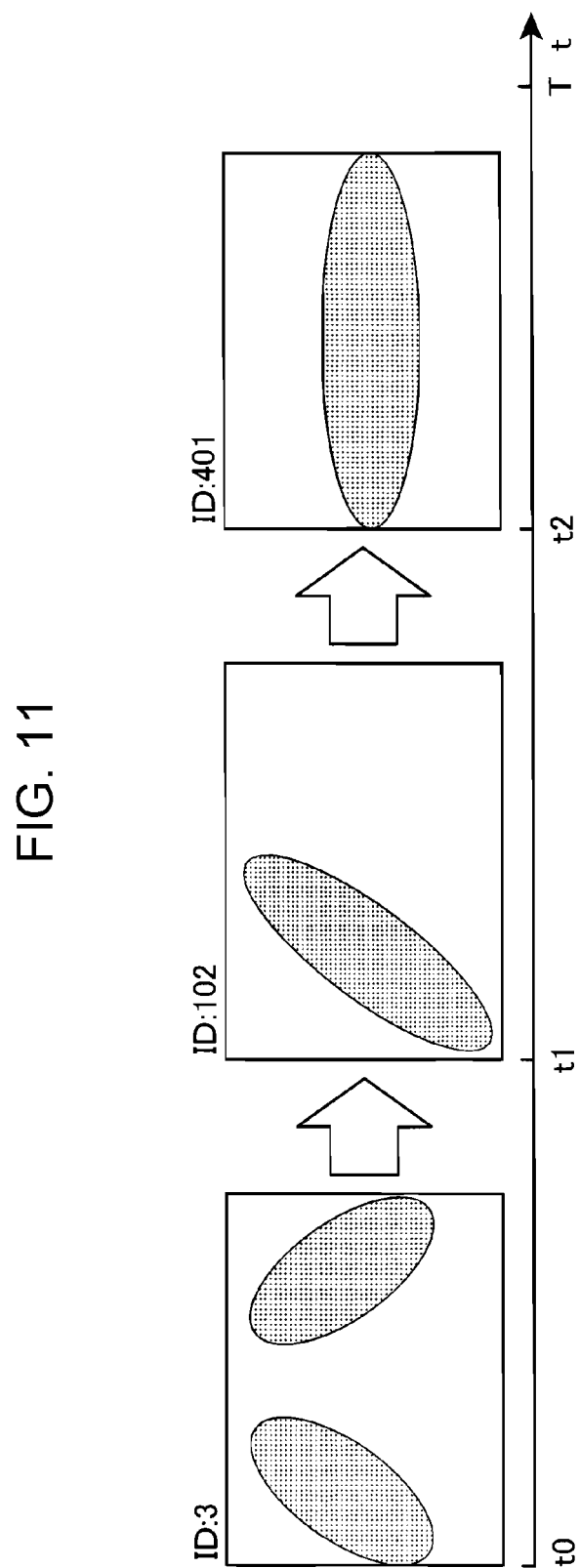

METHOD OF SWITCHING VEHICLE DRIVE MODE FROM AUTOMATIC DRIVE MODE TO MANUAL DRIVE MODE DEPENDING ON ACCURACY OF DETECTING OBJECT

BACKGROUND

1. Technical Field

The present disclosure relates to a drive control apparatus, a drive control method, and a drive control program for controlling driving a vehicle in one of following modes, an automatic drive mode in which the vehicle is driven automatically, and a manual drive mode in which the vehicle is driven manually by a driver.

2. Description of the Related Art

In recent years, actives to develop techniques of automatically driving vehicles have been made. In a circumstance in which it is difficult to drive, in an automatic drive mode, a vehicle having an automatic driving capability, it may be desirable to drive the vehicle manually by a driver instead of driving the vehicle in the automatic drive mode.

For example, in a technique disclosed in U.S. Pat. No. 8,352,110, a control computer determines whether it is possible to safely control a vehicle, and in a case where the control computer determines that it is possible to safely control the vehicle, the vehicle is automatically driven, but otherwise the vehicle is manually driven.

SUMMARY

However, a further improvement is necessary in the technique described above.

One non-limiting and exemplary embodiment provides an apparatus including a first memory, and circuitry that, in operation, performs operations including, storing, in the first memory, an object occurrence map defining an occurrence area where there is a possibility that an object appears, detecting the object included in a captured image of a scene seen in a running direction of a vehicle, switching a vehicle drive mode, based on a result of the detection of the object and the object occurrence map, from an automatic drive mode in which the vehicle is automatically driven to a manual drive mode in which the vehicle is driven manually by a driver, and controlling driving of the vehicle in the switched manual drive mode.

In the present disclosure, depending on the accuracy of detecting an object, it is possible to switch the vehicle drive mode from the automatic drive mode in which the vehicle is driven automatically to the manual drive mode in which the vehicle is driven manually by a driver.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a flow chart illustrating an operation of a drive control apparatus according to the third embodiment; and FIG. 11 is a schematic diagram illustrating a process of switching a vehicle drive mode from an automatic drive mode to a manual drive mode according to the third embodiment.

DETAILED DESCRIPTION

Figure 1:
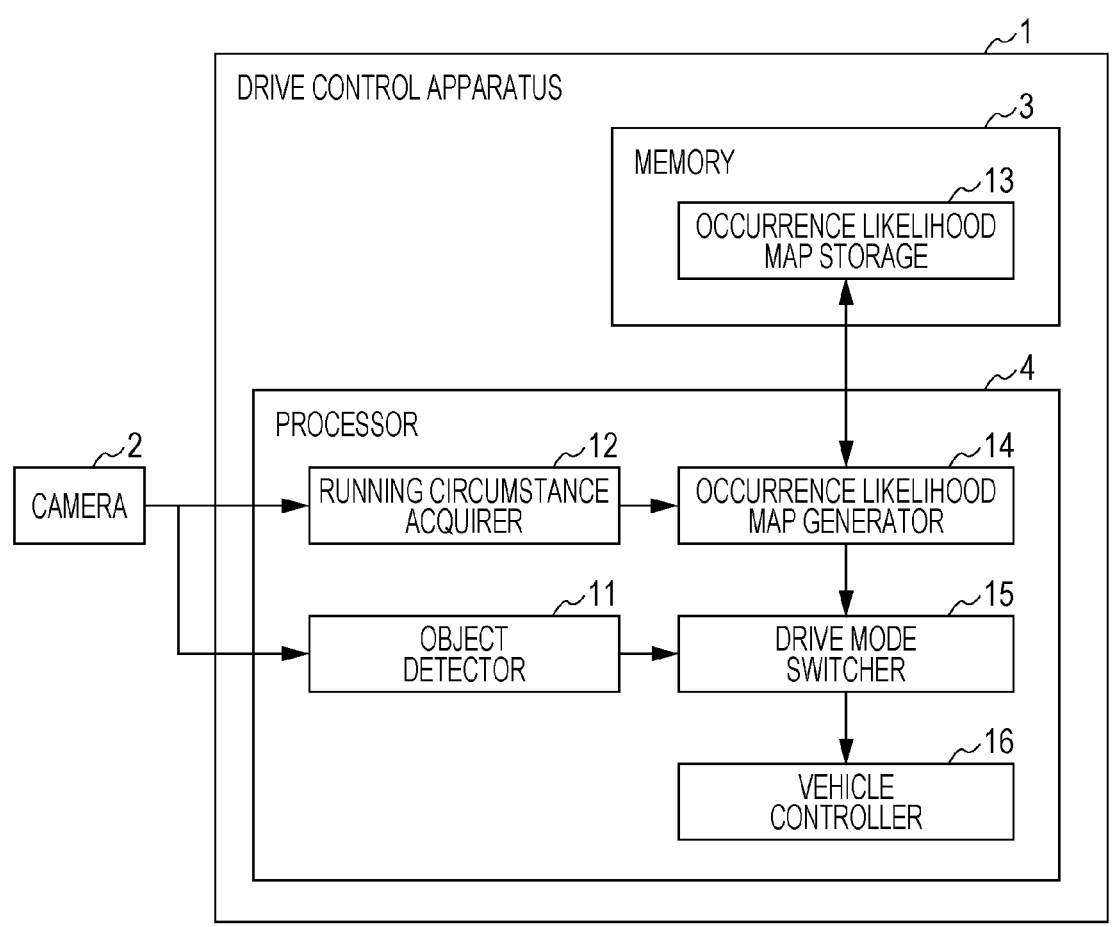
FIG. 1 is a block diagram illustrating a configuration of a vehicle control system according to a first embodiment.

Underlying Knowledge Forming Basis of the Present Disclosure

In the technique disclosed in U.S. Pat. No. 8,352,110, as described above, a control computer determines whether it is possible to safely control a vehicle, and in a case where the control computer determines that it is possible to safely control the vehicle, the vehicle is automatically driven but otherwise the vehicle is manually driven. In the technique disclosed in U.S. Pat. No. 8,352,110, for example, the control computer determines that it is not possible to safely control the vehicle at a point for which there is no history indicating that the point has been driven in the past. In a case where a plurality of obstacles approaching the vehicle are detected, the control computer determines that it is not possible to safely control the vehicle.

In U.S. Pat. No. 8,352,110, conditions in terms of the state of the external circumstance where it is not possible to perform safe control are defined based on knowledge acquired by humans. However, there is a difference in criterion for determination between humans and a system in recognizing an obstacle in the external circumstance. Therefore, there is a possibility that an external circumstance easily recognizable by humans may be difficult for the recognition system to correctly recognize. Therefore, in the automatic driving, it is necessary to take into account behavior and performance of the recognition system in recognizing the state of the external circumstance.

In view of the above, according to an aspect, the present disclosure provides an apparatus including a first memory, and circuitry that, in operation, performs operations including including storing, in the first memory, an object occurrence map defining an occurrence area where there is a possibility that an object appears, detecting the object included in a captured image of a scene seen in a running direction of a vehicle, switching a vehicle drive mode, based on a result of the detection of the object and the object occurrence map, from an automatic drive mode in which the vehicle is automatically driven to a manual drive mode in which the vehicle is driven manually by a driver, and controlling driving of the vehicle in the switched manual drive mode.

In this aspect, the object occurrence map defining the occurrence area, where there is a possibility that an object appears, is stored in the first memory. An object in the captured image of the scene seen in the running direction of the vehicle is detected. Based on the result of the detection of the object and the object occurrence map, the vehicle drive mode is switched from the automatic drive mode to the manual drive mode. The driving of the vehicle is controlled in the switched manual drive mode.

Thus, the determination as to whether the vehicle drive mode is to be switched from the automatic drive mode to the manual drive mode is performed based on the result of the detection of the object and the object occurrence map defining the occurrence area where there is a possibility that an object may appear. That is, depending on the object detection accuracy, it is possible to switch the vehicle drive mode from the automatic drive mode in which the vehicle is automatically driven to the manual drive mode in which the vehicle is driven manually by a driver.

In the apparatus, in another aspect, the object occurrence map may be managed in relation to map information.

In this aspect, the object occurrence map is managed in relation to map information and thus it is possible to define the occurrence area on a map where there is a possibility that an object appears.

In the apparatus, in another aspect, the operations may further include acquiring a running circumstance around the vehicle, and, depending on the acquired running circumstance, generating a viewpoint-converted object occurrence map from the object occurrence map so as to be represented from the same viewpoint as that of the captured image, wherein the switching may include superimposing the viewpoint-converted object occurrence map on the captured image, and in a case where a location of the object detected in the captured image is outside the occurrence area in the viewpoint-converted object occurrence map, switching the vehicle drive mode from the automatic drive mode to the manual drive mode.

In this aspect, the running circumstance around the vehicle is acquired. Depending on the acquired running circumstance, the viewpoint-converted object occurrence map is generated from the object occurrence map so as to be represented as seen from the same viewpoint as that of the captured image. The viewpoint-converted object occurrence map is superimposed on the captured image. In a case where the location of the object detected in the captured image is outside the occurrence area in the viewpoint-converted object occurrence map, the vehicle drive mode is switched from the automatic drive mode to the manual drive mode.

Therefore, in the case where the location of the object detected in the captured image is outside the occurrence area in the viewpoint-converted object occurrence map, it is determined that the detection of the object is not reliable, and thus the vehicle drive mode is switched from the automatic drive mode to the manual drive mode and the vehicle is driven by a driver.

In the apparatus, in another aspect, the map may include a three-dimensional map represented in a three-dimensional coordinate system, the occurrence area may include an occurrence space in which there is a possibility that the object appears on the three-dimensional map, and the generating may include converting the object occurrence map in the three-dimensional coordinate system to the viewpoint-converted object occurrence map in a two-dimensional coordinate system as seen from the same viewpoint as that of the captured image.

In this aspect, the map includes the three-dimensional map represented in the three-dimensional coordinate system, and the occurrence area includes the occurrence space in which there is a possibility that the object appears on the three-dimensional map. The object occurrence map in the three-dimensional coordinate system is converted to the viewpoint-converted object occurrence map in the two-dimensional coordinate system as seen from the same viewpoint as that of the captured image.

Thus, the object occurrence map defines the occurrence space on the three-dimensional map where there is a possibility that an object appears, and it is possible to more accurately define the range of the occurrence space where there is a possibility that the object, which makes it possible to enhance the reliability of switching the vehicle drive mode from the automatic drive mode to the manual drive mode.

In the apparatus, in another aspect, in the storing, a plurality of object occurrence maps may be stored that are respectively represented in the two-dimensional coordinate system as seen from a same viewpoint as that of the captured image, and that respectively define occurrence areas depending on shapes of a plurality of roads, and the operations may further include acquiring a shape of a road included in the captured image of the scene seen in the travelling direction of the vehicle, and determining one object occurrence map corresponding to the acquired shape of the road from the plurality of object occurrence maps.

In this aspect, the first memory stores a plurality of object occurrence maps which are respectively represented in the two-dimensional coordinate system as seen from the same viewpoint as that of the captured image and which respectively define occurrence areas depending on shapes of a plurality of roads. The shape of the road is acquired from the captured image of the scene seen in the running direction of the vehicle. One object occurrence map corresponding to the acquired shape of the road is determined from the plurality of object occurrence maps.

By storing in the memory, not map data, but a plurality of object occurrence maps which are respectively represented in the two-dimensional coordinate system as seen from the same viewpoint as that of the captured image and which respectively define occurrence areas depending on shapes of a plurality of roads in the above-described manner, it is possible to reduce the amount of data stored in the memory.

In the apparatus in another aspect, the map may include a three-dimensional map represented in a three-dimensional coordinate system, and the occurrence area may include an occurrence space in which there is a possibility that the object appears on the three-dimensional map, in the storing, a plurality of object occurrence maps may be stored that are respectively represented in the three-dimensional coordinate system, and that respectively define occurrence spaces depending on shapes of a plurality of roads, and the operations may further include acquiring a shape of a road included in the captured image of the scene seen in the travelling direction of the vehicle, determining one object occurrence map corresponding to the acquired shape of the road from the plurality of object occurrence maps, and in a case where the one object occurrence map is determined, converting the one object occurrence map in the three-dimensional coordinate system to an object occurrence map in the same two-dimensional coordinate system as that of the captured image.

In this aspect, the map includes the three-dimensional map represented in the three-dimensional coordinate system, and the occurrence area includes the occurrence space in which there is a possibility that an object appears on the three-dimensional map. The first memory stores the plurality of object occurrence maps which are respectively represented in the three-dimensional coordinate system and which respectively define occurrence spaces depending on shapes of a plurality of roads. The shape of a road is acquired from the captured image of the scene seen in the running direction of the vehicle. One object occurrence map corresponding to the acquired shape of the road is determined from the plurality of object occurrence maps. In a case where the one object occurrence map is determined, the one object occurrence map in the three-dimensional coordinate system is converted to the object occurrence map in the same two-dimensional coordinate system as that of the captured image.

Thus, the plurality of object occurrence maps each define an occurrence space on the three-dimensional map where there is a possibility that an object appears, and thus the range where there is a possibility that an object appears is defined more accurately as the occurrence space, which makes it possible to enhance the reliability of switching the vehicle drive mode from the automatic drive mode to the manual drive mode.

In the apparatus, in another aspect, the apparatus may further include a second memory, and in the storing, a plurality of object occurrence maps may be stored that are respectively represented in the two-dimensional coordinate system as seen from the same viewpoint as that of the captured image, and that respectively define occurrence areas depending on shapes of a plurality of roads, the operations may further include determining, depending on a location of the object detected in the captured image, one object occurrence map from the plurality of object occurrence maps, storing, in the second memory, an identification number corresponding to the determined one object occurrence map, and wherein in the switching, in a case where the identification number stored in the second memory is switched a predetermined number of times during a predetermined period of time, the vehicle drive mode is switched from the automatic drive mode to the manual drive mode.

In this aspect, in the storing, the first memory stores plurality of object occurrence maps which are respectively represented in the two-dimensional coordinate system as seen from the same viewpoint as that of the captured image and which respectively define occurrence areas depending on shapes of a plurality of roads. Depending on the location of the object detected in the captured image, one object occurrence map is determined from the plurality of object occurrence maps, and the identification number corresponding to the determined one object occurrence map is stored in the second memory. When the identification number stored in the second memory is switched the predetermined number of times during the predetermined period of time, the vehicle drive mode is switched from the automatic drive mode to the manual drive mode.

Therefore, when a change in the object occurrence map occurs for a short period, it can be determined that objects are not accurately detected. In such a situation, by switching the vehicle drive mode from the automatic drive mode to the manual drive mode, it becomes possible to safely drive the vehicle by a driver.

In the apparatus, in another aspect, the object may be a person, and the occurrence area may be an area where the person passes.

In this aspect, it is possible to switch, depending on the person detection accuracy, the vehicle drive mode from the automatic drive mode in which the vehicle is driven automatically to the manual drive mode in which the vehicle is driven manually by a driver.

In another aspect, the present disclosure provides a method including detecting an object included in a captured image of a scene seen in a running direction of a vehicle, and based on a result of the detection of the object and an object occurrence map, defining an occurrence area where there is a possibility that the object appears, switching a vehicle drive mode from an automatic drive mode in which the vehicle is automatically driven to a manual drive mode in which the vehicle is driven manually by a driver, and controlling driving of the vehicle in the switched manual drive mode.

In this aspect, an object is detected from the captured image of the scene seen in the running direction of the vehicle. Based on a result of the detection of the object and the object occurrence map defining the occurrence area where there is a possibility that the object appears, the vehicle drive mode is switched from the automatic drive mode to the manual drive mode. In the switched manual drive mode, the driving of the vehicle is controlled.

Thus, the determination as to whether the vehicle drive mode is to be switched from the automatic drive mode to the manual drive mode is performed based on the result of the detection of the object and the object occurrence map defining the occurrence area where there is a possibility that an object may appear. That is, depending on the object detection accuracy, it is possible to switch the vehicle drive mode from the automatic drive mode in which the vehicle is automatically driven to the manual drive mode in which the vehicle is driven manually by a driver.

In another aspect, the present disclosure provides a non-transitory computer-readable storage medium storing a program, the program causing a computer to execute a method when the program is executed by the computer, the method including detecting an object included in a captured image of a scene seen in a running direction of a vehicle, and based on a result of the detection of the object and an object occurrence map, defining an occurrence area where there is a possibility that the object appears, switching a vehicle drive mode from an automatic drive mode in which the vehicle is automatically driven to a manual drive mode in which the vehicle is driven manually by a driver, and controlling driving of the vehicle in the switched manual drive mode.

In this aspect, the object occurrence map defining the occurrence area where there is a possibility that an object appears is stored in the first memory. An object is detected from the captured image of the scene seen in the running direction of the vehicle. Based on the result of the detection of the object and the object occurrence map, the vehicle drive mode is switched from the automatic drive mode to the manual drive mode. In the switched manual drive mode, the driving of the vehicle is controlled.

Thus, the determination as to whether the vehicle drive mode is to be switched from the automatic drive mode to the manual drive mode is performed based on the result of the detection of the object and the object occurrence map defining the occurrence area where there is a possibility that an object may appear. That is, depending on the object detection accuracy, it is possible to switch the vehicle drive mode from the automatic drive mode in which the vehicle is automatically driven to the manual drive mode in which the vehicle is driven manually by a driver.

Referring to accompanying drawings, embodiments of the present disclosure are described below. Note that the embodiments described below are provided by way of example, but the technical scope of the present disclosure is not limited to those embodiments.

First Embodiment

FIG. 1 is a block diagram illustrating a configuration of a vehicle control system according to a first embodiment. The vehicle control system shown in FIG. 1 includes a drive control apparatus 1 and a camera 2. The drive control apparatus 1 controls driving of a vehicle in an automatic drive mode in which the vehicle is automatically driven or a manual drive mode in which the vehicle is driven manually by a driver. Although it is assumed by way of example that the vehicle is a car in the following description, the vehicle in the present disclosure is not limited to the car, but the vehicle may be a vehicle of a type other than the car, such as a motorcycle, a truck, a bus, a train, an airplane, or the like.

The camera 2 is installed near a rearview mirror of the vehicle to take an image of a scene in front of the vehicle. The camera 2 may take not only the image of the scene in front of the vehicle but an image of a scene behind the vehicle or other scenes.

The drive control apparatus 1 is installed in the vehicle. The drive control apparatus 1 includes a memory 3 and a processor 4.

The memory 3 is a computer-readable storage medium such as a hard disk drive, a read only memory (ROM), a random access memory (RAM), an optical disk, a semiconductor memory, or the like. The memory 3 stores a drive control program executed by the processor 4. The memory 3 includes an occurrence likelihood map storage 13.

The occurrence likelihood map storage 13 is an example of the first memory for storing an occurrence likelihood map (an object occurrence map) defining an occurrence area where there is a possibility that an object appears. The occurrence likelihood map is managed in relation to map information. In the first embodiment, the occurrence likelihood map defines an occurrence area on a two-dimensional map where there is a possibility that an object appears. The object may be, for example, a person or a vehicle, and the occurrence likelihood map indicates individually an occurrence area where a person passes and an occurrence area where a vehicle passes.

The occurrence likelihood map is stored in advance in the occurrence likelihood map storage 13. However, alternatively, the occurrence likelihood map may be acquired from a server via a communication unit (not shown) and stored in the occurrence likelihood map storage 13.

Still alternatively, the occurrence area in the occurrence likelihood map may be calculated based on statistic data of detections of persons or vehicles in the past. The occurrence area of the occurrence likelihood map may be defined on the two-dimensional map by an operator, for example, according to a particular rule such as the Road Traffic Law such that an occurrence area is defined in an area where a person or a vehicle is allowed to pass.

The processor 4 is, for example, a central processing unit (CPU) and executes the drive control program stored in the memory 3. The processor 4 includes an object detector 11, a running circumstance acquirer 12, an occurrence likelihood map generator 14, a drive mode switcher 15 and a vehicle controller 16.

The object detector 11 detects an object included in a captured image, taken by the camera 2, of a scene seen in a running direction of a vehicle. More specifically, the object detector 11 detects a person or a vehicle included in the captured image, taken by the camera 2, of the scene seen in the running direction of the vehicle. To detect the person or the vehicle included in the captured image, for example, the object detector 11 inputs the captured image to a machine-learned neural network thereby detecting the person or the vehicle. Note that objects detected by the object detector 11 are not limited to persons and vehicles.

The running circumstance acquirer 12 acquires a running circumstance around the vehicle. From the captured image, taken by the camera 2, of the scene seen in the running direction of the vehicle, the running circumstance acquirer 12 recognizes a traffic lane line drawn on a road and acquires a shape of the road on which the vehicle is running. Furthermore, from the captured image, the running circumstance acquirer 12 recognizes a traffic sign and a traffic signal and acquires traffic sign information and traffic signal information. Furthermore, the running circumstance acquirer 12 acquires a travelling direction of the vehicle, a speed of the vehicle, and a current location of the vehicle. The running circumstance acquirer 12 may acquire the location and the orientation of the vehicle on a three-dimensional map by using a sensor (for example, Laser Imaging Detection and Ranging (LIDAR)) other than a camera. Note that it is also possible to acquire the current location from a not-shown Global Positioning System (GPS). It is possible to determine the travelling direction by acquiring locations of two points from the GPS and calculating the travelling direction from the locations of the two points.

The occurrence likelihood map generator 14 is an example of a generator and generates an occurrence likelihood map image as seen from the same viewpoint as that of a captured image depending on the running circumstance acquired by the running circumstance acquirer 12. In the present embodiment, the occurrence likelihood map generator 14 generates the occurrence likelihood map image as described above. However, the form of the occurrence likelihood map is not limited to the occurrence likelihood map image. For example, the occurrence likelihood map may be represented in the form of a two-dimensional matrix corresponding to a viewpoint. The occurrence likelihood map generator 14 is capable of identifying the location of the vehicle on the occurrence likelihood map and the direction in which the vehicle is running based on the current location of the vehicle and the travelling direction of the vehicle acquired by the running circumstance acquirer 12. Furthermore, the occurrence likelihood map generator 14 identifies the position of the viewpoint and the shooting angle of the camera 2 from the location of the traffic lane acquired by the running circumstance acquirer 12. The running circumstance acquirer 12 may acquire the location of the viewpoint and the shooting angle of the camera 2 from pre-stored data. The occurrence likelihood map generator 14 then generates the occurrence likelihood map image as seen in the traveling direction from the current location of the vehicle on the occurrence likelihood map and as seen from the same viewpoint as that of the captured image.

The drive mode switcher 15 is an example of a switcher and switches the vehicle drive mode from the automatic drive mode to the manual drive mode based on the object detection result and the occurrence likelihood map. The drive mode switcher 15 superimposes the occurrence likelihood map image on the captured image. On this superimposed image, if the location of an object in the captured image is outside the occurrence area in the occurrence likelihood map image, then the drive mode switcher 15 switches the drive mode from the automatic drive mode to the manual drive mode.

The vehicle controller 16 controls the driving of the vehicle in the automatic drive mode in which the vehicle is driven automatically or the manual drive mode in which the vehicle is driven manually by a driver. In the case where the drive mode is the manual drive mode as a result of the switching by the drive mode switcher 15, the vehicle controller 16 controls the driving of the vehicle in the manual drive mode.

Next, an operation of the drive control apparatus according to the first embodiment is described below.

Figure 2:
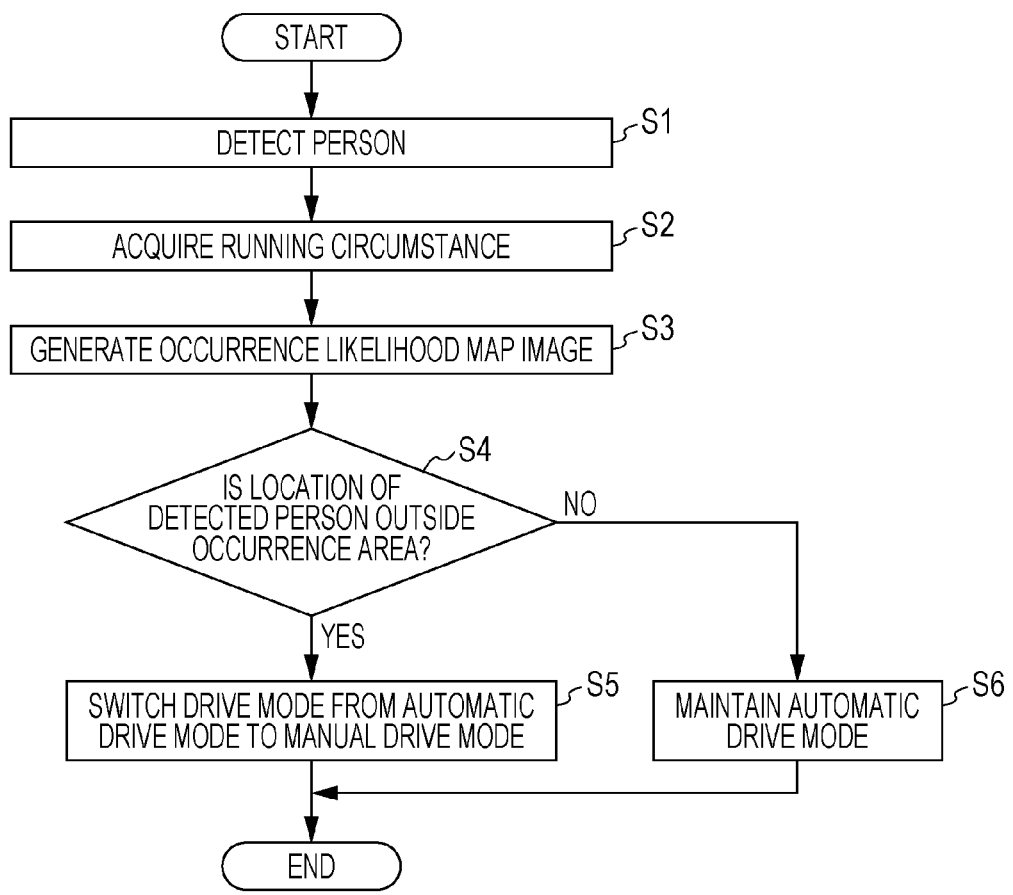
FIG. 2 is a flow chart illustrating an operation of a drive control apparatus according to the first embodiment.

FIG. 2 is a flow chart illustrating the operation of the drive control apparatus according to the first embodiment.

First, in step S1, the object detector 11 detects a person included in a captured image, taken by the camera 2, of a scene seen in a running direction of a vehicle. Note that in the following description, it is assumed by way of example that a person is detected as an object. To detect the person included in the captured image, the object detector 11 performs image recognition. Note that the object detector 11 may detect not only a pedestrian but also a person riding a bicycle.

Next, in step S2, the running circumstance acquirer 12 acquires a running circumstance around the vehicle. More specifically, as described above, the running circumstance acquirer 12 recognizes traffic lanes drawn on a road on the captured image taken by the camera 2, and acquires a shape of the road on which the vehicle is running. Furthermore, the running circumstance acquirer 12 acquires the travelling direction of the vehicle and the current location of the vehicle.

Next, in step S3, the occurrence likelihood map generator 14 generates an occurrence likelihood map image as seen from the same viewpoint as that of the captured image depending on the running circumstance acquired by the running circumstance acquirer 12.

Next, in step S4, the drive mode switcher 15 superimposes the occurrence likelihood map image on the captured image, and determines whether the location of the person included in the captured image is outside the occurrence area in the occurrence likelihood map image. In a case where it is determined that the location of the detected person is outside the occurrence area (YES in step S4), in step S5, the drive mode switcher 15 switches the drive mode from the automatic drive mode to the manual drive mode.

On the other hand, in a case where it is determined that the location of the detected person is not outside the occurrence area (NO in step S4), then in step S6, the drive mode switcher 15 maintains the current automatic drive mode.

Note that in a case where when the drive mode is in the manual drive mode, it is determined that the location of the detected person is not outside the occurrence area, the drive mode switcher 15 may switch the vehicle drive mode from the manual drive mode to the automatic drive mode.

In the case where the vehicle drive mode is switched from the automatic drive mode to the manual drive mode, the drive mode switcher 15 may inform a driver that the vehicle drive mode is to be switched from the automatic drive mode to the manual drive mode. In this case, the drive mode switcher 15 may provide the notification by a voice or an image. Furthermore, after the drive mode switcher 15 notifies the driver that the drive mode is to be switched from the automatic drive mode to the manual drive mode, the drive mode switcher 15 may switch the vehicle drive mode from the automatic drive mode to the manual drive mode.

Although in the example described above with reference to FIG. 2, the determination as to whether the vehicle drive mode is to be switched from the automatic drive mode to the manual drive mode is performed every one frame, the determination as to whether the vehicle drive mode is to be switched from the automatic drive mode to the manual drive mode may be performed based on a result for a plurality of frames.

Figure 3:
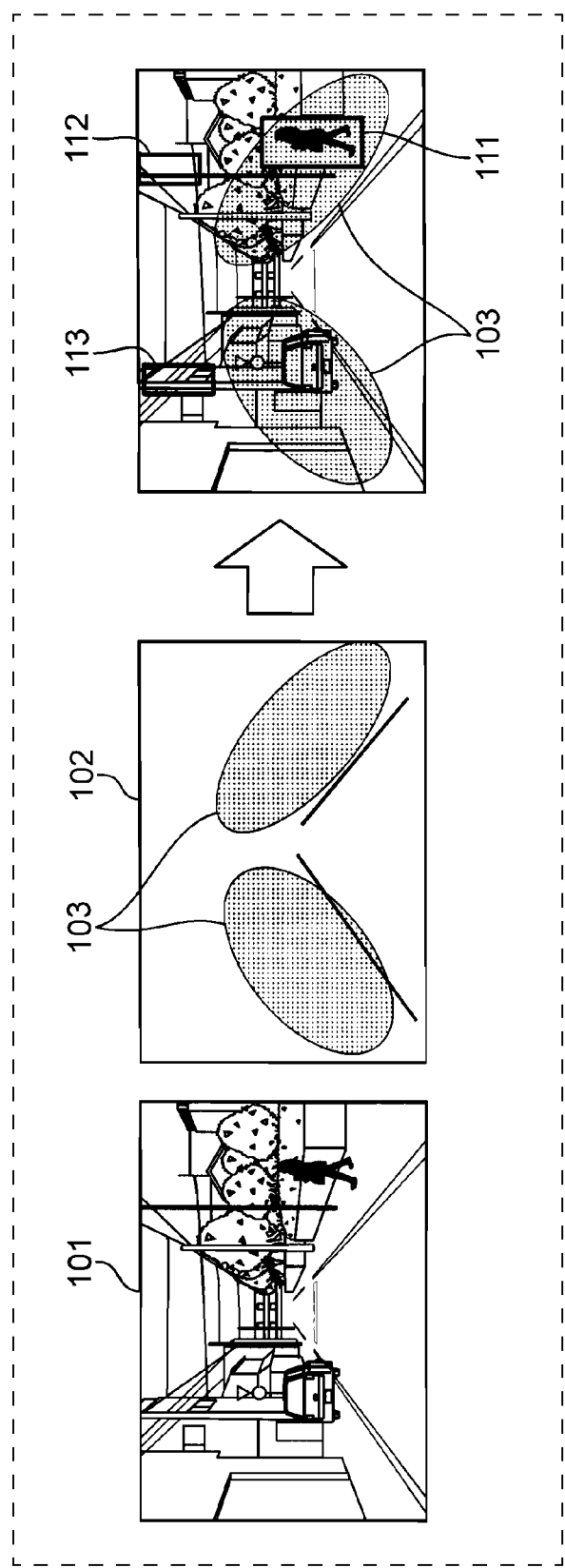
FIG. 3 is a schematic diagram illustrating a process of switching a vehicle drive mode from an automatic drive mode to a manual drive mode according to the first embodiment.

Referring to FIG. 3, a process of switching the vehicle drive mode from the automatic drive mode to the manual drive mode is described below.

The drive mode switcher 15 superimposes the occurrence likelihood map image 102 on the captured image 101. The occurrence likelihood map image 102 includes an occurrence area 103 where there is a higher probability that a person appears than in other areas. In the example shown in FIG. 3, the occurrence area 103 is defined on a pedestrian sidewalk outside a vehicle road. Although in the example shown in FIG. 3, the occurrence area 103 has an elliptic shape, the shape of the occurrence area in the present disclosure is not limited to ellipse, and any shape may be employed as the shape of the occurrence area.

In FIG. 3, the object detector 11 detects a person, but also detects utility poles erroneously as persons. In this specific case, the person is detected at a detection position 111 within the occurrence area 103, but utility poles are detected at detection positions 112 and 113 outside the occurrence area 103. Therefore, the drive mode switcher 15 determines that the detection positions 112 and 113 of the persons in the captured image 101 are outside the occurrence area 103 in the occurrence likelihood map image 102, and the drive mode switcher 15 switches the vehicle drive mode from the automatic drive mode to the manual drive mode.

In the example shown in FIG. 3, there are two objects which are detected as persons by the object detector 11 and whose detection positions are determined as being outside the occurrence area 103. However, when at least one person is detected outside the occurrence area 103, the vehicle drive mode is switched from the automatic drive mode to the manual drive mode.

As described above, in the case where a person is detected outside the occurrence area 103 which is an area where there is a possibility that a person appears, there is a high probability that the detection of the person by the object detector 11 is not correct, and thus it is determined that it is difficult to continue the driving in the automatic drive mode, and the vehicle drive mode is switched from the automatic drive mode to the manual drive mode. Thus, depending on the reliability of the detection of the object, the vehicle drive mode is switched from the automatic drive mode in which the vehicle is driven automatically to the manual drive mode in which the vehicle is driven manually by a driver, that is, when the reliability of the detection is low, the automatic drive mode is cancelled and the vehicle is driven by the driver.

In the example described above, the occurrence likelihood map defines an occurrence area on a two-dimensional map where there is a possibility that an object appears. Alternatively, the occurrence likelihood map may define an occurrence space on a three-dimensional map where there is a possibility that an object appears. In this case, the occurrence likelihood map generator 14 converts an occurrence likelihood map in the three-dimensional coordinate system to an occurrence likelihood map image in the two-dimensional coordinate system as seen from the same viewpoint as that of the captured image depending on the running circumstance acquired by the running circumstance acquirer 12.

In this case, the occurrence likelihood map defines the occurrence space on the three-dimensional map where there is a possibility that an object appears, and thus the range where there is a possibility that an object appears is defined more accurately as the occurrence space, which makes it possible to enhance the reliability of switching the vehicle drive mode from the automatic drive mode to the manual drive mode.

Figure 4:
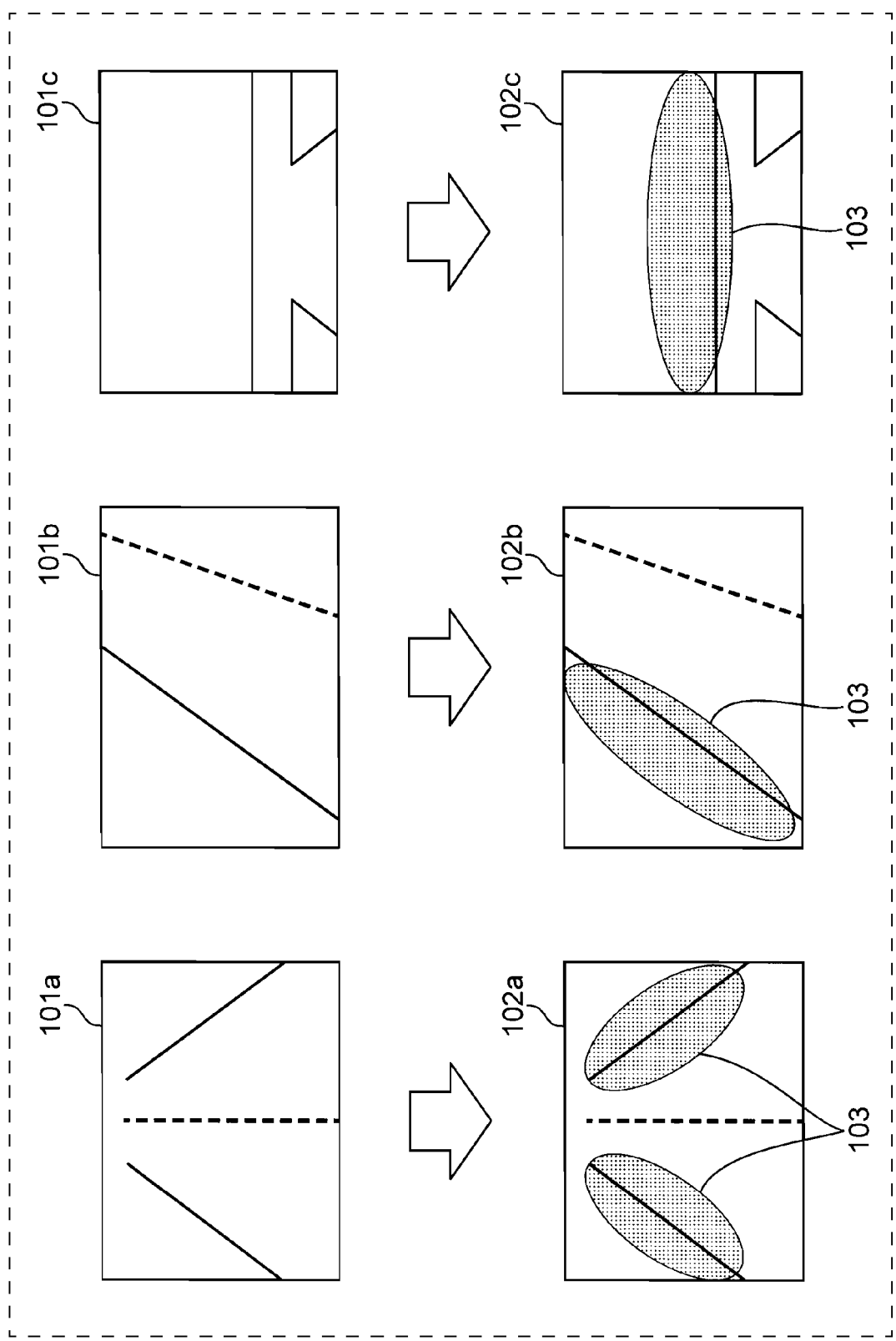
FIG. 4 is a diagram illustrating examples of captured images and occurrence likelihood map images according to a modification to the first embodiment.

FIG. 4 is a diagram illustrating examples of captured images and occurrence likelihood map images according to a modification to the first embodiment.

As illustrated in FIG. 4, the occurrence likelihood map storage 13 may store a plurality of occurrence likelihood map images which are respectively represented in the two-dimensional coordinate system as seen from the same viewpoint as that of the captured image and which respectively define occurrence areas depending on shapes of roads. For example, in an occurrence likelihood map image 102a, occurrence areas 103 are defined on both sides of a vehicle road. In an occurrence likelihood map image 102b, an occurrence area 103 is defined on a left-hand side of a vehicle road. In an occurrence likelihood map image 102c, an occurrence area 103 is defined at a T-shape intersection.

In the modification to the first embodiment, the drive control apparatus 1 includes an occurrence likelihood map determiner instead of the occurrence likelihood map generator 14.

The running circumstance acquirer 12 recognizes traffic lanes drawn on a road on the captured image taken by the camera 2, and acquires the shape of a road included in a captured image of a scene seen in a running direction of a vehicle. The occurrence likelihood map determiner determines one occurrence likelihood map image corresponding to the shape of the road acquired by the running circumstance acquirer 12 from a plurality of occurrence likelihood map images stored in the occurrence likelihood map storage 13. That is, in FIG. 4, for the captured image 101a, the occurrence likelihood map image 102a that matches the road shape of the captured image 101a is selected, the occurrence likelihood map image 102b that matches the road shape of the captured image 101b is selected for the captured image 101b, and the occurrence likelihood map image 102c that matches the road shape of the captured image 101c is selected for the captured image 101c.

By storing, in the memory 3, not map data but a plurality of occurrence likelihood map images which are respectively represented in the two-dimensional coordinate system as seen from the same viewpoint as that of the captured image and which respectively define occurrence areas depending on shapes of a plurality of roads in the above-described manner, it is possible to reduce the amount of data stored in the memory 3.

In the first embodiment, when it is determined that the location of the detected person in the captured image 101 is outside the occurrence area 103 in the occurrence likelihood map image 102, the vehicle drive mode is switched from the automatic drive mode to the manual drive mode. However, in the present disclosure, the condition for switching the vehicle drive mode is not limited to the example described above. For example, in a case where two objects of the same type which are not supposed to be detected at the same time are detected within an occurrence area, the vehicle drive mode may be switched from the automatic drive mode to the manual drive mode.

Figure 5:
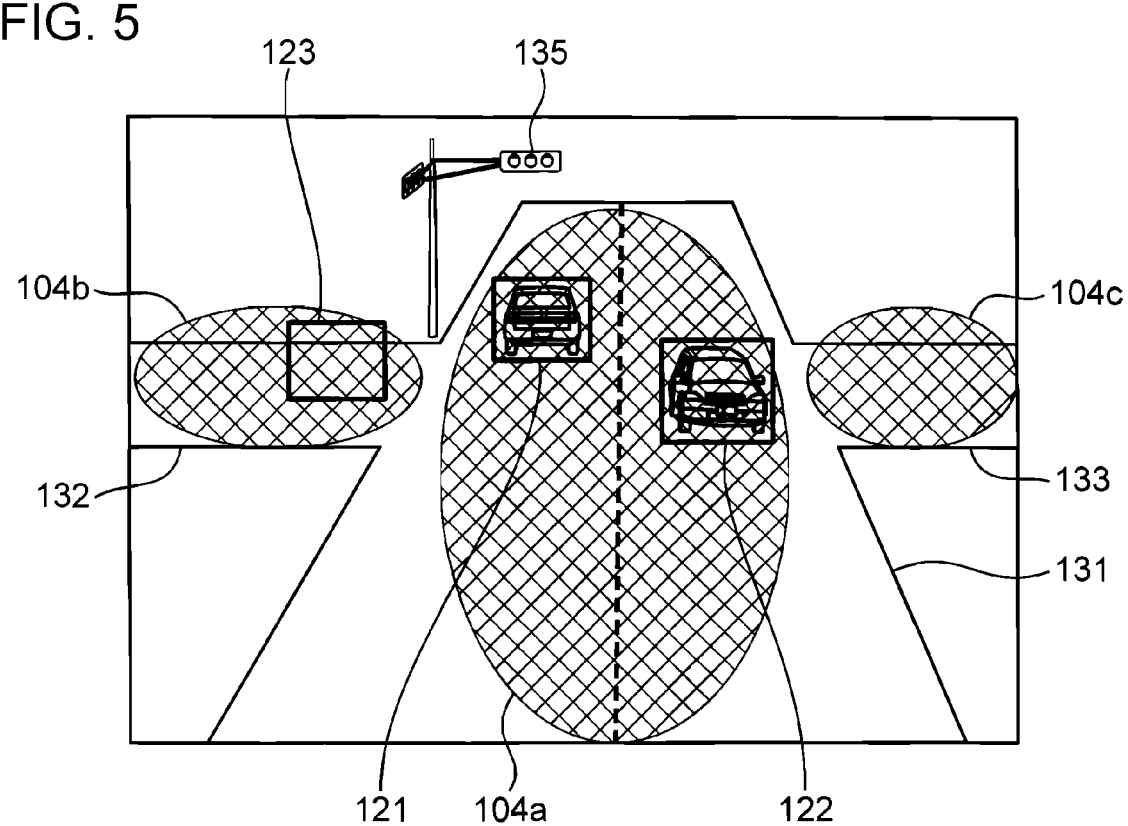
FIG. 5 is a schematic diagram illustrating an example in which two objects of the same type, which are not supposed to be detected at the same time, are detected within an occurrence area in the first embodiment.

FIG. 5 is a schematic diagram illustrating an example in which two objects of the same type which are not supposed to be detected at the same time are detected within an occurrence area in the present embodiment 1.

In FIG. 5, an occurrence likelihood map image 102 is superimposed on a captured image 101, and vehicles are detected by the object detector 11. The occurrence likelihood map image 102 includes an occurrence area 104a defined on a vehicle road 131 in a travelling direction of the vehicles, an occurrence area 104b defined on a vehicle road 132 extending leftward from an intersection of the vehicle road 131 along which the vehicles are running, and an occurrence area 104c defined on a vehicle road 133 extending rightward from the intersection of the vehicle road 131 along which the vehicles are running. The occurrence areas 104a, 104b, and 104c are areas where there is a possibility that a vehicle may appear.

The detection positions 121 and 122 of the respective vehicles are correctly detected by the object detector 11. However, the detection position 123 is detected erroneously such that not a vehicle but a part of the vehicle road 132 is detected erroneously as a vehicle.

The running circumstance acquirer 12 recognizes a color of a traffic signal 135 from a captured image 101 taken by the camera 2. As a result, the running circumstance acquirer 12 acquires traffic signal information indicating that the color of the traffic signal 135 is green in this example. The detection positions 121, 122, and 123 detected by the object detector 11 are all within the occurrence area 104a or 104b, and thus, in a normal situation, the drive mode switcher 15 maintains the current automatic drive mode without switching to the manual drive mode from the automatic drive mode.

However, the automatic drive mode acquired by the running circumstance acquirer 12 indicates that the traffic signal is in green, and thus no vehicle is supposed to enter the intersection from the vehicle road 132. In view of this, when the drive mode switcher 15 determines that the detection positions 121, 122, and 123 of the vehicles in the captured image 101 are within either one of the two occurrence areas 104a and 104b in the occurrence likelihood map image 102, and the drive mode switcher 15 further determines whether the traffic signal information indicates that the traffic signal is in green or not, and if it is determined that the traffic signal is in green, the drive mode switcher 15 switches the vehicle drive mode from the automatic drive mode to the manual drive mode.

As described above, in the case where two vehicles of the same type that are not supposed to be detected at the same time are detected in occurrence areas, the vehicle drive mode is switched from the automatic drive mode to the manual drive mode.

In the present embodiment 1, also in a case where two objects of different types which are not supposed to be detected at the same time are detected in occurrence areas, the vehicle drive mode may be switched from the automatic drive mode to the manual drive mode.

Figure 6:
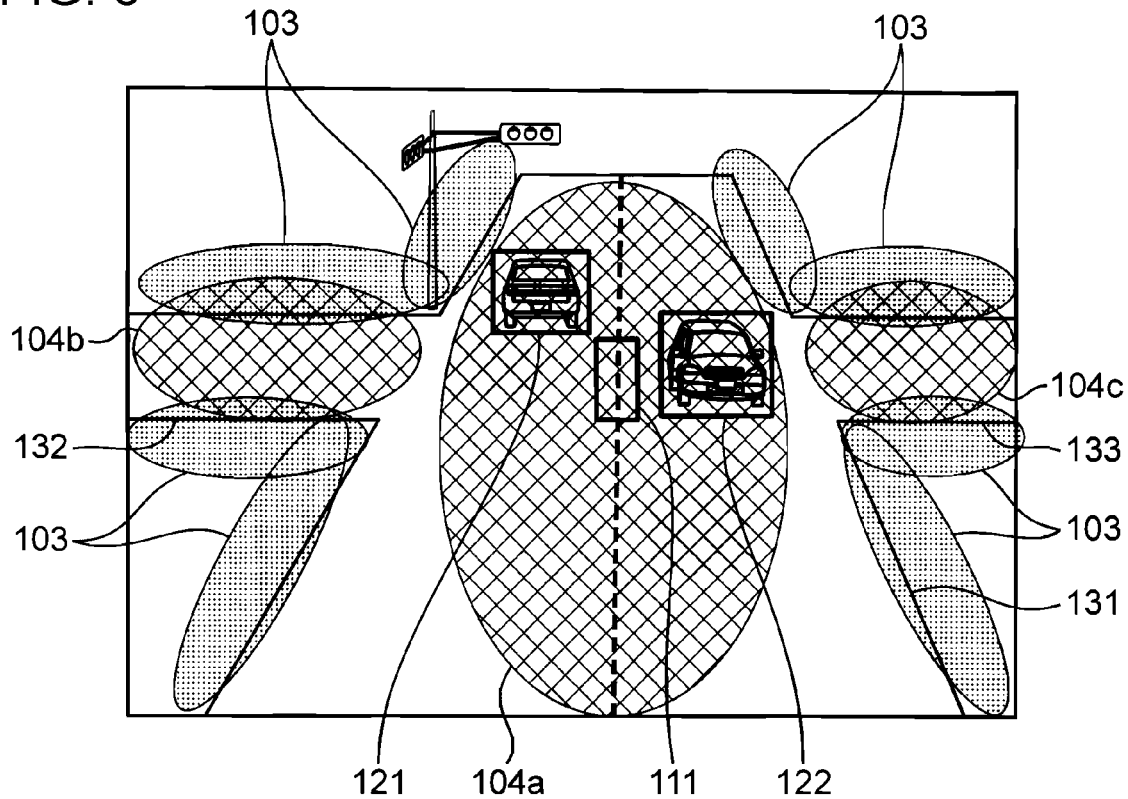
FIG. 6 is a schematic diagram illustrating an example in which two objects of different types, which are not supposed to be detected at the same time, are detected within an occurrence area in the first embodiment.

FIG. 6 is a schematic diagram illustrating an example in which two objects of different types which are not supposed to be detected at the same time are detected within occurrence areas in the present embodiment 1.

In FIG. 6, an occurrence likelihood map image 102 is superimposed on a captured image 101, and a person and a vehicle, which are two objects of different types, are detected by the object detector 11. The occurrence likelihood map image 102 includes an occurrence area 104a defined on a vehicle road 131 in a travelling direction of the vehicles, an occurrence area 104b defined on a vehicle road 132 extending leftward from an intersection of the vehicle road 131 along which the vehicles are running, and an occurrence area 104c defined on a vehicle road 133 extending rightward from the intersection of the vehicle road 131 along which the vehicles are running. The occurrence areas 104a, 104b, and 104c are areas where there is a possibility that a vehicle may appear.

The occurrence likelihood map image 102 includes occurrence areas 103 defined on both sides of each of vehicle roads 131, 132, and 133. The occurrence areas 103 are areas where there is a possibility that a person may appear.

The detection positions 121 and 122 of the respective vehicles are correctly detected by the object detector 11. However, the detection position 111 is detected erroneously such that not a person but a part of the vehicle road 131 is detected erroneously as a person.

The occurrence area 104a is an area where there is a possibility that a vehicle may appear but there is no possibility that a person may appear. Therefore, it is not supposed to detect a vehicle and a person at the same time in the occurrence area 104a. In view of the above, when the drive mode switcher 15 determines that the detection positions 121 and 122 of the vehicles and the detection position 111 of the person in the captured image 101 are within the occurrence area 104a in the occurrence likelihood map image 102, then the drive mode switcher 15 switches the vehicle drive mode from the automatic drive mode to the manual drive mode.

As described above, in the case where two vehicles of different types that are not supposed to be detected at the same time are detected in an occurrence area, the vehicle drive mode is switched from the automatic drive mode to the manual drive mode.

Second Embodiment

In the first embodiment described above, the occurrence likelihood map storage 13 stores an occurrence likelihood map defining an occurrence area on a two-dimensional map where there is a possibility that an object appears. In a second embodiment described below, the occurrence likelihood map storage 13 stores an occurrence likelihood map defining an occurrence space on a three-dimensional map where there is a possibility that an object appears.

Figure 7:
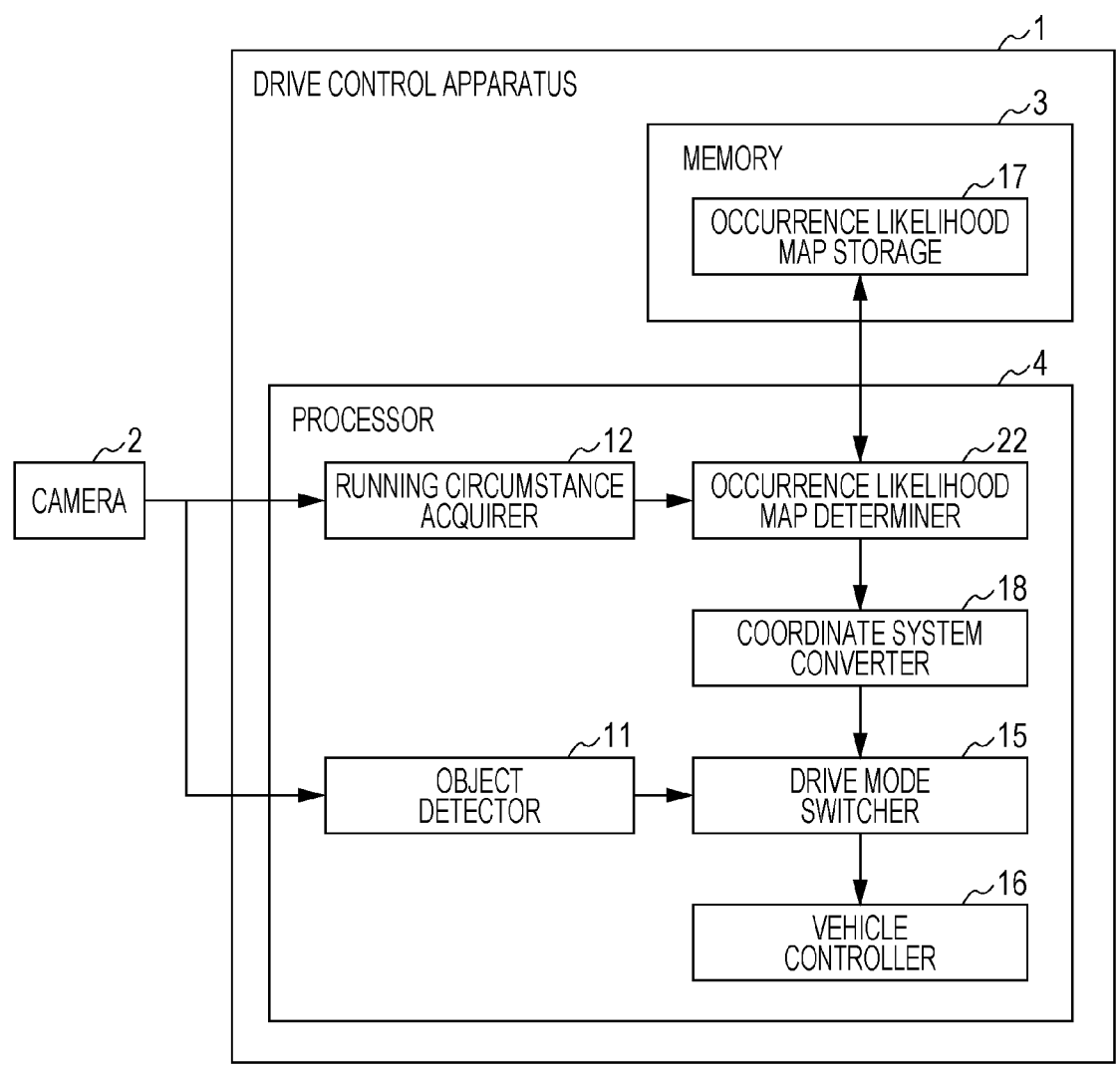
FIG. 7 is a block diagram illustrating a configuration of a vehicle control system according to a second embodiment.

FIG. 7 is a block diagram illustrating a configuration of a vehicle control system according to a first embodiment. The vehicle control system shown in FIG. 7 includes a drive control apparatus 1 and a camera 2. The drive control apparatus 1 includes a memory 3 and a processor 4. The memory 3 includes an occurrence likelihood map storage 17.

The occurrence likelihood map storage 17 is an example of a map storage and stores a plurality of occurrence likelihood maps (models) defining occurrence areas for a plurality of roads having different shapes represented in a three-dimensional coordinate system. In the present embodiment 2, the plurality of occurrence likelihood maps each define an occurrence space on a three-dimensional map where there is a possibility that an object appears. The object may be, for example, a person or a vehicle, and the occurrence likelihood maps each indicates individually an occurrence area where a person passes and an occurrence area where a vehicle passes. Note that the occurrence space is not a two-dimensional area but a three-dimensional space.

The plurality of occurrence likelihood maps are stored in advance in the occurrence likelihood map storage 17. However, alternatively, the occurrence likelihood maps may be acquired from a server via a communication unit (not shown) and stored in the occurrence likelihood map storage 17.

The occurrence spaces of the plurality of occurrence likelihood maps may be calculated based on statistic data of detections of persons or vehicles in the past. The occurrence spaces of the plurality of occurrence likelihood maps may be defined on the three-dimensional map by an operator, according to a particular rule such as the Road Traffic Law such that an occurrence space is defined in a space where a person or a vehicle is allowed to pass.

The processor 4 is, for example, a CPU, and executes a drive control program stored in the memory 3. The processor 4 includes an object detector 11, a running circumstance acquirer 12, an occurrence likelihood map determiner 22, a drive mode switcher 15 a vehicle controller 16, and a coordinate system converter 18. In the second embodiment, similar elements to those in the first embodiment are denoted by similar reference numerals or symbols, and a further description thereof is omitted.

The occurrence likelihood map determiner 22 determines one occurrence likelihood map corresponding to the shape of the road acquired by the running circumstance acquirer 12 from a plurality of occurrence likelihood maps stored in the occurrence likelihood map storage 17.

When one occurrence likelihood map is determined by the occurrence likelihood map determiner 22, the coordinate system converter 18 converts the occurrence likelihood map in the three-dimensional coordinate system to an occurrence likelihood map image in the same two-dimensional coordinate system as that in which the captured image is represented.

Next, an operation of the drive control apparatus according to the second embodiment is described below.

Figure 8:
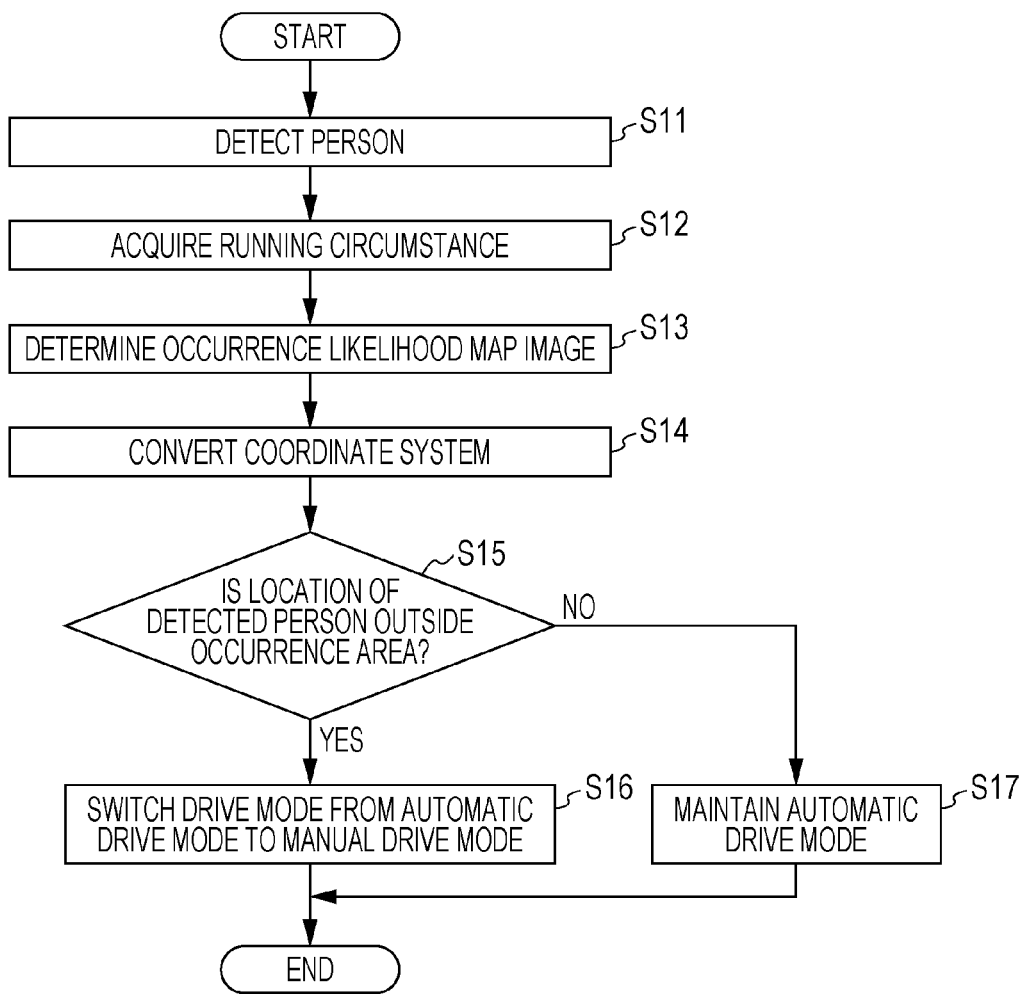
FIG. 8 is a flow chart illustrating an operation of a drive control apparatus according to the second embodiment.

FIG. 8 is a flow chart illustrating the operation of the drive control apparatus according to a second embodiment.

The process in step S11 to step S12 is similar to the process in step S1 to step S2 shown in FIG. 2, and thus a further description thereof is omitted.

In step S13, the occurrence likelihood map determiner 22 determines one occurrence likelihood map corresponding to the shape of the road acquired by the running circumstance acquirer 12 from a plurality of occurrence likelihood maps stored in the occurrence likelihood map storage 17.

Next, in step S14, the coordinate system converter 18 converts the one occurrence likelihood map in the three-dimensional coordinate system determined by the occurrence likelihood map determiner 22 to an occurrence likelihood map image in the same two-dimensional coordinate system as that in which the captured image is represented. That is, the one occurrence likelihood map determined by the occurrence likelihood map determiner 22 is represented in the three-dimensional coordinate system, and the coordinate system converter 18 converts the one occurrence likelihood map represented in the three-dimensional coordinate system to an occurrence likelihood map image represented in the two-dimensional viewpoint-based coordinate system with reference to the viewpoint of the camera 2.

The process in step S15 to step S17 is similar to the process in step S4 to step S6 shown in FIG. 2, and thus a further description thereof is omitted.

As described above, the occurrence space in which there is a possibility that an object appears is represented not in the two-dimensional coordinate system but in the three-dimensional coordinate system, and thus it is possible to more precisely define the range of the occurrence space, which makes it possible to enhance the reliability of switching the vehicle drive mode from the automatic drive mode to the manual drive mode.

Third Embodiment

In the second embodiment described above, the occurrence likelihood map image is determined depending on the running circumstance. In a third embodiment described below, an occurrence likelihood map image is determined depending on a location where an object is detected. When the occurrence likelihood map image is switched a predetermined number of times during a predetermined period of time, the vehicle drive mode is switched from the automatic drive mode to the manual drive mode.

Figure 9:
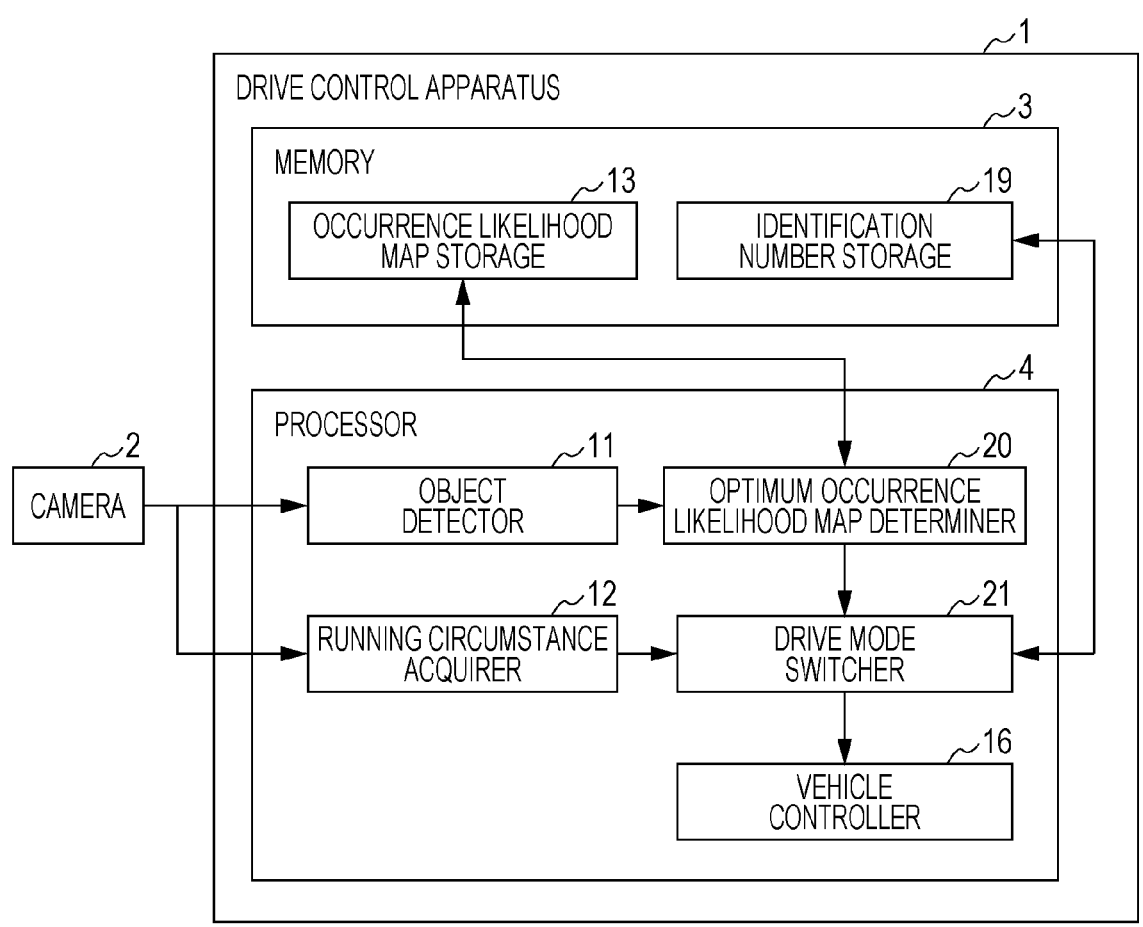
FIG. 9 is a block diagram illustrating a configuration of a vehicle control system according to a third embodiment.

FIG. 9 is a block diagram illustrating a configuration of a vehicle control system according to the third embodiment. The vehicle control system shown in FIG. 9 includes a drive control apparatus 1 and a camera 2. The drive control apparatus 1 includes a memory 3 and a processor 4. The memory 3 includes an occurrence likelihood map storage 13 and an identification number storage 19. In the third embodiment, similar elements to those in the first embodiment are denoted by similar reference numerals or symbols, and a further description thereof is omitted.

The occurrence likelihood map storage 13 stores a plurality of occurrence likelihood map images which are respectively represented in the two-dimensional coordinate system as seen from the same viewpoint as that of the captured image and which respectively define occurrence areas depending on shapes of roads. The occurrence likelihood map images are respectively assigned identification numbers.

The identification number storage 19 stores an identification number identifying an occurrence likelihood map image determined by the optimum occurrence likelihood map determiner 20.

The processor 4 is, for example, a CPU, and executes a drive control program stored in the memory 3. The processor 4 includes an object detector 11, a running circumstance acquirer 12, a vehicle controller 16, an optimum occurrence likelihood map determiner 20, and a drive mode switcher 21.

The optimum occurrence likelihood map determiner 20 determines, depending on the location of the object detected in the captured image, one occurrence likelihood map image from the plurality of occurrence likelihood map images, and the optimum occurrence likelihood map determiner 20 stores, in the identification number storage 19, the identification number corresponding to the determined one occurrence likelihood map image.

When the identification number stored in the identification number storage 19 is switched a predetermined number of times during a predetermined period of time, the drive mode switcher 21 switches the vehicle drive mode from the automatic drive mode to the manual drive mode.

Next, an operation of the drive control apparatus according to the third embodiment is described below.

FIG. 10 is a flow chart illustrating the operation of the drive control apparatus according to the third embodiment.

The process in step S21 to step S22 is similar to the process in step S1 to step S2 shown in FIG. 2, and thus a further description thereof is omitted.

In step S23, the optimum occurrence likelihood map determiner 20 determines, depending on the location of the object detected in the captured image, one occurrence likelihood map image from the plurality of occurrence likelihood map images. The optimum occurrence likelihood map determiner 20 determines, from the plurality of occurrence likelihood map images, an optimum occurrence likelihood map image having an occurrence area matching a location where an object is detected.

Next, in step S24, the optimum occurrence likelihood map determiner 20 stores, in the identification number storage 19, the identification number of the determined occurrence likelihood map image.

Next, in step S25, the drive mode switcher 21 determines whether counting is being performed as to the elapsed time since the identification number of the optimum occurrence likelihood map image is stored for the first time in the identification number storage 19. In a case where it determined that the elapsed time is not being counted (NO in step S25), then in step S26, the drive mode switcher 21 starts counting the elapsed time since the identification number of the optimum occurrence likelihood map image is stored for the first time in the identification number storage 19. After the time counting is started, the processing flow returns to step S21.

In a case where it is determined that the elapsed time is being counted (YES in step S25) then in step S27, the drive mode switcher 21 determines whether the elapsed time has reached a predetermined value. In a case where it is determined that the elapsed time has not reached the predetermined value (NO in step S27), the processing flow returns to step S21.

On the other hand, in a case where it is determined that the elapsed time has reached the predetermined value (YES in step S27), then in step S28, the drive mode switcher 21 determines whether the identification number stored in the identification number storage 19 has been switched a predetermined number of times during a predetermined period of time. In the identification number storage 19, identification numbers of optimum occurrence likelihood map images determined during the predetermined period of time by the optimum occurrence likelihood map determiner 20 are stored cumulatively. Therefore, by counting the number of identification numbers stored in the identification number storage 19 when the predetermined period of time has expired, it is possible to determine how many times the identification number has been changed.

In a case where it is determined that the identification number has been changed the predetermined number of times (YES in step S28), then in step S29, the drive mode switcher 21 switches the vehicle drive mode from the automatic drive mode to the manual drive mode.

On the other hand, in a case where it is determined that the identification number has not been changed the predetermined number of times (NO in step S28), then in step S30 the drive mode switcher 21 maintains the current automatic drive mode.

FIG. 11 is a schematic diagram illustrating the process of switching the vehicle drive mode from the automatic drive mode to the manual drive mode according to the third embodiment. In FIG. 11, a horizontal axis represents time t.

As illustrated in FIG. 11, at time t0, a person included in the captured image is detected, and an occurrence likelihood map image is determined depending on the location where the object is detected in the captured image. The identification number (ID:3 in the present example) of the determined optimum occurrence likelihood map image is stored in the identification number storage 19, and the counting of the elapsed time since time t0 is started.

Next, the determination is performed as to whether the elapsed time has reached a predetermined value T. The predetermined value of the period is, for example, 1 second. In a case where the elapsed time has not reached the predetermined value T, and the process of detecting a person in the captured image is performed again. On the other hand, in a case where it is determined that the elapsed time has reached the predetermined value T, then a further determination is performed whether the identification number has been changed the predetermined number of times. The predetermined number is, for example, two. That is, in a case where the occurrence likelihood map image is changed twice during one second, the vehicle drive mode is switched from the automatic drive mode to the manual drive mode.

In example shown in FIG. 11, an identification number (ID:3) is first stored, an identification number (ID:102) is then stored at time t1, and finally, at time t2, an identification number (ID:401) is stored. Therefore, the occurrence likelihood map image has been changed twice before the elapsed time has reached the predetermined value T. Thus, in this example, it is determined that the identification number has been changed the predetermined number of times during the predetermined period of time T, and the vehicle drive mode is switched from the automatic drive mode to the manual drive mode.

When a change in the occurrence likelihood map image occurs for a short period, it can be determined that objects are not accurately detected. In such a situation, by switching the vehicle drive mode from the automatic drive mode to the manual drive mode, it becomes possible to safely drive the vehicle by a driver in the manual drive mode instead of driving the vehicle in the automatic drive mode in the state in which objects are not detected accurately.

In the present disclosure, all or part of units, apparatuses, and elements and all or part of functional blocks illustrated in the figures may be implemented by one or more electronic circuits including a semiconductor device, a semiconductor integrated circuit (IC), an LSI (Large Scale Integration). The LSI or the IC may be integrated on a single chip or may be realized by a combination of a plurality of chips. For example, functional blocks other than storage elements may be integrated on a signal chip. The integrated circuits called the LSI or the IC herein may be called differently depending on the integration scale, and integrated circuits called a system LSI, a VLSI (Very Large Scale Integration), or a ULSI (Ultra Large Scale Integration) may also be used in the present disclosure. Furthermore, a field programmable gate array (FPGA) capable of being programmed after the LIS is produced, and a reconfigurable logic device capable of being reconfigured in terms of internal connections or capable of being set up in terms of internal circuits segments may also be used for the same purpose.

Furthermore, functions or operations of all or part of units, apparatuses, and elements may be executed by software. In this case, the software may be stored in a non-transitory storage medium. The non-transitory storage medium may be one of or a combination of a ROM, an optical disk, a hard disk drive, or the like. When the software is executed by a processor, a function corresponding to the software is executed by the processor and a peripheral apparatus. The system or the apparatus may include one of or a combination of a non-transitory storage medium, a processor, a hardware device such as an interface, and the like.

The drive control apparatus, the drive control method, and the drive control program according to the present disclosure are capable of, depending on the object detection accuracy, switching the vehicle drive mode from the automatic drive mode in which the vehicle is automatically driven to the manual drive mode in which the vehicle is driven manually by a driver, and are useful in controlling the driving of the vehicle in the automatic drive mode or the manual drive mode.

What is claimed is:

1. An apparatus for use by a vehicle configured to operate in an automatic drive mode, in which the vehicle is automatically driven, and a manual drive mode, in which the vehicle is driven manually by a driver, comprising:
  a first memory; and
  circuitry that, in operation, performs operations including
    storing, in the first memory, an object occurrence map defining an object occurrence area representing a predefined area of a scene of predetermined dimensions
      i) outside the vehicle path when viewed from the vehicle in a running direction of the vehicle,
      ii) smaller than the entire area of the scene outside the vehicle path when viewed from the vehicle in the running direction of the vehicle, and
      iii) based on data of past detections of an object in the area of the scene outside the vehicle path, where there is a higher probability that the object will exist in the scene than in other areas outside the vehicle and detectable by a sensor of the vehicle;
    detecting the object included in a captured image of the scene seen in the running direction of the vehicle;
    determining whether the detected object is outside the object occurrence area;
    determining that the detecting of the object is unreliable when it is determined that the object is outside the object occurrence area;
    switching a vehicle drive mode to the manual drive mode in response to determining that the detecting of the object is unreliable as a result of the detected object being detected to be outside the object occurrence area;
    maintaining the vehicle in the automatic drive mode in response to determining that the detected object is not outside the object occurrence area; and
    controlling driving of the vehicle in the switched manual drive mode when the drive mode is switched and controlling the driving of vehicle in the automatic drive mode when the drive mode is not switched.

2. The apparatus according to claim 1, wherein the object occurrence map is managed in relation to map information.

3. The apparatus according to claim 1,
  wherein the operations further include
    acquiring a running circumstance around the vehicle; and
    depending on the acquired running circumstance, generating a viewpoint-converted object occurrence map from the object occurrence map so as to be represented from the same viewpoint as that of the captured image,
  wherein the switching operation includes
    superimposing the viewpoint-converted object occurrence map on the captured image, and
    in a case where a location of the object detected in the captured image is outside the occurrence area in the viewpoint-converted object occurrence map, switching the vehicle drive mode from the automatic drive mode to the manual drive mode.

4. The apparatus according to claim 3, wherein
the map includes a three-dimensional map represented in a three-dimensional coordinate system,
the occurrence area includes an occurrence space in which there is a possibility that the object appears on the three-dimensional map, and
the generating operation includes converting the object occurrence map in the three-dimensional coordinate system to the viewpoint-converted object occurrence map in a two-dimensional coordinate system as seen from the same viewpoint as that of the captured image.

5. The apparatus according to claim 1,
wherein, in the storing operation, a plurality of object occurrence maps are stored that are respectively represented in the two-dimensional coordinate system as seen from a same viewpoint as that of the captured image, and that respectively define occurrence areas depending on shapes of a plurality of roads, and
wherein the operations further include
acquiring a shape of a road included in the captured image of the scene seen in the travelling direction of the vehicle, and
determining one object occurrence map corresponding to the acquired shape of the road from the plurality of object occurrence maps.

6. The apparatus according to claim 1,
wherein the map includes a three-dimensional map represented in a three-dimensional coordinate system, and the occurrence area includes an occurrence space in which there is a possibility that the object appears on the three-dimensional map,
wherein in the storing operation, a plurality of object occurrence maps are stored that are respectively represented in the three-dimensional coordinate system, and that respectively define occurrence spaces depending on shapes of a plurality of roads, and
wherein the operations further include
acquiring a shape of a road included in the captured image of the scene seen in the travelling direction of the vehicle,
determining one object occurrence map corresponding to the acquired shape of the road from the plurality of object occurrence maps, and
in a case where the one object occurrence map is determined, converting the one object occurrence map in the three-dimensional coordinate system to an object occurrence map in the same two-dimensional coordinate system as that of the captured image.

7. The apparatus according to claim 1, further comprising:
a second memory,
wherein in the storing operation, a plurality of object occurrence maps are stored that are respectively represented in the two-dimensional coordinate system as seen from the same viewpoint as that of the captured image, and that respectively define occurrence areas depending on shapes of a plurality of roads,
wherein the operations further include
determining, depending on a location of the object detected in the captured image, one object occurrence map from the plurality of object occurrence maps, and
storing, in the second memory, an identification number corresponding to the determined one object occurrence map, and wherein in the switching operation, in a case where the identification number stored in the second memory is switched a predetermined number of times during a predetermined period of time, the vehicle drive mode is switched from the automatic drive mode to the manual drive mode.

8. The apparatus according to claim 1, wherein
the object is a person, and
the occurrence area is an area where the person passes.

9. The apparatus according to claim 1, wherein the circuitry also performs operations including:
detecting the shape of a road on which the vehicle travels from a scene outside the running vehicle, captured in the running direction of the vehicle; and
determining the dimensions and shape of an object occurrence map to match the detected shape of the road,
wherein the storing operation stores, in the first memory, the object occurrence map whose dimensions and shape are based on the detected shape of the road, the object occurrence map whose dimensions and shape are based on the detected shape of the road defining the occurrence area representing the predefined area of the scene of predetermined dimensions based on data of past detections of the object in the scene, where there is a probability that the object will exist in the scene.

10. The apparatus according to claim 1, wherein the circuitry also performs operations including:
detecting traffic signal information on the state of a traffic signal of a road on which the vehicle travels; and
detecting whether two objects of the same type are present at the same time in the object occurrence map defining the occurrence area representing the predefined area of the scene of predetermined dimensions outside the vehicle in the direction in which the vehicle travels,
wherein the switching operation switches the vehicle drive mode, based on a result of the detection of the traffic signal information and the detection of whether two objects of the same type are present in an object occurrence map, from the automatic drive mode, in which the vehicle is automatically driven, to the manual drive mode, in which the vehicle is driven manually by the driver.

11. The apparatus according to claim 1, wherein the circuitry, in operation, further performs an operation including when the vehicle drive mode is in the manual drive mode, and it is determined that the location of the detected person is not outside the occurrence area, switching the vehicle drive mode from the manual drive mode to the automatic drive mode.

12. The apparatus according to claim 1, wherein the circuitry, in operation, further performs operations including:
generating the object occurrence map for superimposition on the captured image; and
superimposing the object occurrence map for superimposition on the captured image and determining whether the detected object is outside the object occurrence area,
wherein the circuitry operations are performed in the following order,
1) the detecting operation,
2) the generating operation,
3) the superimposing operation, and
4) the switching and maintaining operations.

13. The apparatus according to claim 1, wherein the circuitry, in operation, further performs an operation including switching from the automatic drive mode to the manual drive mode in response to switching of a determined object occurrence map image a predetermined number of times during a predetermined period of time as the object occurrence map is determined repeatedly depending on the location of a detected object as the vehicle travels on the vehicle path.

14. A method for use by a vehicle configured to operate in an automatic drive mode, in which the vehicle is automatically driven, and a manual drive mode, in which the vehicle is driven manually by a driver, comprising:
   detecting an object included in a captured image of a scene seen in a running direction of a vehicle;
   determining whether the detected object is outside an object occurrence area of an object occurrence map representing a predefined area of the scene of predetermined dimensions
      i) outside the vehicle path when viewed from the vehicle in a running direction of the vehicle,
      ii) smaller than the entire area of the scene outside the vehicle path when viewed from the vehicle in the running direction of the vehicle, and
      iii) based on data of past detections of the object in the area of the scene outside the vehicle path, where there is a higher probability that the object will exist in the scene than in other areas outside the vehicle and detectable by a sensor of the vehicle;
   determining that the detecting of the object is unreliable when it is determined that the object is outside the object occurrence area;
   switching a vehicle drive mode from the automatic drive mode to the manual drive mode in response to determining that the detecting of the object is unreliable as a result of the detected object being detected to be outside the object occurrence area;
   maintaining the vehicle in the automatic drive mode in response to determining that the detected object is not outside the object occurrence area; and
   controlling driving of the vehicle in the switched manual drive mode when the drive mode is switched and controlling the driving of vehicle in the automatic drive mode when the drive mode is not switched.

15. A non-transitory computer-readable storage medium storing a program, the program causing a computer to execute a method when the program is executed by the computer, the method for use by a vehicle configured to operate in an automatic drive mode, in which the vehicle is automatically driven, and a manual drive mode, in which the vehicle is driven manually by a driver, including:
   detecting an object included in a captured image of a scene seen in a running direction of a vehicle,
   determining whether the detected object is outside an object occurrence area of an object occurrence map representing a predefined area of the scene of predetermined dimensions
      i) outside the vehicle path when viewed from the vehicle in a running direction of the vehicle,
      ii) smaller than the entire area of the scene outside the vehicle path when viewed from the vehicle in the running direction of the vehicle, and
      iii) based on data of past detections of the object in the area of the scene outside the vehicle path, where there is a higher probability that the object will exist in the scene than in other areas outside the vehicle and detectable by a sensor of the vehicle;
   determining that the detecting of the object is unreliable when it is determined that the object is outside the object occurrence area;
   switching a vehicle drive mode from the automatic drive mode to the manual drive mode in response to determining that the detecting of the object is unreliable as a result of the detected object being detected to be outside the object occurrence area;
   maintaining the vehicle in the automatic drive mode in response to determining that the detected object is not outside the object occurrence area; and
   controlling driving of the vehicle in the switched manual drive mode when the drive mode is switched and controlling the driving of vehicle in the automatic drive mode when the drive mode is not switched.

16. An apparatus for use in a vehicle, configured to operate in an automatic drive mode, in which the vehicle is automatically driven, and a manual drive mode, in which the vehicle is driven manually by a driver, comprising:
   a first memory; and
   circuitry that, in operation, performs operations including
      storing, in the first memory, an object occurrence map defining an object occurrence area of a captured image of a scene seen in a running direction of a vehicle, and representing a predefined area of predetermined dimensions of the scene
         i) outside the vehicle path when viewed from the vehicle in a running direction of the vehicle,
         ii) smaller than the entire area of the scene outside the vehicle path when viewed from the vehicle in the running direction of the vehicle, and
         iii) in which where there is a higher probability that the object exists than in another area of the captured image of the scene;
      detecting the object included in the captured image of the scene seen in the running direction of the vehicle;
      determining whether the detected object is outside the occurrence area;
      determining that the detecting of the object is unreliable when it is determined that the object is outside the object occurrence area;
      switching a vehicle drive mode from the automatic drive mode to the manual drive mode in response to determining that detecting of the object is unreliable as a result of the detected object being detected to be outside the object occurrence area;
      maintaining the vehicle in the automatic drive mode in response to determining that the detected object is not outside the object occurrence area; and
      controlling driving of the vehicle in the switched manual drive mode when the drive mode is switched and controlling the driving of vehicle in the automatic drive mode when the drive mode is not switched.

17. An apparatus for use by a vehicle configured to operate in an automatic drive mode, in which the vehicle is automatically driven, and a manual drive mode, in which the vehicle is driven manually by a driver, comprising:
   a first memory; and
   circuitry that, in operation, performs operations including
      storing, in the first memory, an object occurrence map defining an object occurrence area of a captured image of a scene seen in a running direction of a vehicle, and representing a predefined area of predetermined dimensions of the scene
         i) outside the vehicle path when viewed from the vehicle in a running direction of the vehicle,
         ii) smaller than the entire area of the scene outside the vehicle path when viewed from the vehicle in the running direction of the vehicle, and iii) where an object is to be expected to exist when the vehicle travels in the running direction through the scene;

detecting the object included in the captured image of the scene seen in the running direction of the vehicle;

determining the location of the detected object in relation to the stored occurrence area;

determining that the detecting of the object is unreliable when it is determined that the object is outside the object occurrence area;

switching a vehicle drive mode from the automatic drive mode to the manual drive mode in response to determining that the detecting of the object is unreliable as a result of the detected object being detected to be outside the object occurrence area;

maintaining the vehicle in the automatic drive mode in response to determining that the detected object is not outside the object occurrence area; and controlling driving of the vehicle in the switched manual drive mode when the drive mode is switched and controlling the driving of vehicle in the automatic drive mode when the drive mode is not switched.

\* \* \* \* \*